United States Patent [19]
Takeda et al.

[11] Patent Number: 6,104,114
[45] Date of Patent: Aug. 15, 2000

[54] BRUSHLESS MOTOR

[75] Inventors: Kazuhiro Takeda, Komaki; Hitoshi Urakami, Inukami-Gun, both of Japan

[73] Assignee: Nidec Corporation, Kyoto, Japan

[21] Appl. No.: 09/114,007

[22] Filed: Jul. 10, 1998

[30] Foreign Application Priority Data

Jul. 10, 1997 [JP] Japan ..................................... 9-185514

[51] Int. Cl.[7] .............................. H02K 5/16; H02K 5/00; H02K 7/14; H02K 11/00; F16C 21/00
[52] U.S. Cl. .......................... 310/90; 310/91; 310/67 R; 310/71; 384/126
[58] Field of Search ..................................... 310/67 R, 90, 310/91, 71; 360/98.07, 99.08, 99.04; 384/126, 461

[56] References Cited

U.S. PATENT DOCUMENTS

| | | | |
|---|---|---|---|
| 5,252,871 | 10/1993 | Inoue | 310/90 |
| 5,355,043 | 10/1994 | Kaneda | 310/156 |
| 5,394,283 | 2/1995 | Hans et al. | 310/90 |
| 5,413,413 | 5/1995 | Sakashita et al. | 384/126 |
| 5,445,456 | 8/1995 | Isoda et al. | 384/126 |
| 5,446,325 | 8/1995 | Iwabuchi | 310/67 R |
| 5,461,271 | 10/1995 | Asama et al. | 310/91 |
| 5,604,389 | 2/1997 | Nitta et al. | 310/67 R |
| 5,610,782 | 3/1997 | Tomoe et al. | 360/99.04 |
| 5,694,268 | 12/1997 | Dunfield et al. | 310/67 R |
| 5,774,974 | 7/1998 | Dunfield et al. | 310/67 R |
| 5,783,884 | 7/1998 | Fujishima et al. | 310/90 |

*Primary Examiner*—Clayton LaBalle
*Attorney, Agent, or Firm*—McCormick, Paulding & Huber LLP

[57] ABSTRACT

The brushless motor according to the present invention is small in overall height without deterioration of the rotational accuracy. One of a pair of bearings is interposed between the base plate and the rotor and located on the radially outside of the other one of the bearings. A plurality of receiving holes is formed on the base plate to correspond to the teeth of the stator core to provide an axially space for respectively accommodating coils wound around the stator core. Thus, in spite of the motor having such a small axial clearance between the base plate and the rotor, sufficient amount of winding of coil is ensured. The receiving holes are closed from the outside of the motor with a sheet member and an adhesive is filled therein for fixedly securing the coil of the stator. The adhesive further acts as a damper to absorb magnetic vibration generated at the stator.

20 Claims, 6 Drawing Sheets

BRUSHLESS MOTOR

BACKGROUND OF THE INVENTION

The present invention relates to a brushless motors used to drive a data storage device, and more particularly, to a thin type brushless motor used to drive a data storage device such as a floppy disk and a magneto-optic disk.

Generally, a brushless motor used to drive a data storage device such as a floppy disk and a magneto-optic disk is provided with a base plate to be mounted on a drive unit, a rotor rotatable relative to the base plate and a pair of bearings interposed between the base plate and the rotor. An annular rotor magnet is fixedly secured on the inner surface of the rotor and a stator is attached on the base plate so as to oppose the rotor magnet. Furthermore, the brushless motor is provided with a turntable which rotates with the rotor. The turntable has a table body and a chucking magnet secured on the table body. The data storage device is detachably mounted on the turntable by the magnetic action of the chucking magnet.

In recent years, a drive unit for use to rotate a data storage device such as a floppy disk and a magneto-optic disk are required to be small in axial height due to ongoing tendency of smaller and thinner designs of a notebook type personal computer and other similar equipment in which such a drive unit is mounted.

However, in the conventional brushless motor as mentioned above, a pair of bearings are arranged so as to be axially aligned and spaced apart from each other for stably supporting the rotor. In addition, the turntable is formed separately from the rotor and disposed on the top of the rotor. Therefore, the conventional brushless motor has limitation with respect to reduction of the axial height of the motor. If the motor is arranged to support the rotor by a single bearing for reducing the axial height of the motor, the rotational accuracy of the motor is deteriorated by the inclination of the shaft relative to the rotor and the run out of the rotor.

Furthermore, if the axial height of the motor is reduced, the axial clearance between the rotor and the base plate becomes small, thus, the amount of the coil to be wound around a stator core is limited and then sufficient driving force cannot be obtained.

SUMMARY OF THE INVENTION

It is an object of the present invention to provide a thin type brushless motor that shows sufficient performance.

It is another object of the present invention to provide a thin type brushless motor in which a sufficient amount of coil is wound.

It is still another object of the present invention to provide a thin type brushless motor that enables sufficient amount of coil winding with a simple structure.

It is further object of the present invention to provide a brushless motor that is small in height in comparison with the conventional motor but operates accurately and stably.

The brushless motor according to the present invention is small in overall height without losing the rotational accuracy with one of a pair of bearings interposing between the base plate and the rotor and the other of the bearings being located on the radially outside of the one bearing. A plurality of receiving holes is formed on the base plate to correspond to the teeth of the stator core to provide an axial space for accommodating a coil wound around the stator core. Thus, in spite of a small axial clearance between the base plate and the rotor, sufficient amount of coil is wound around the core. The receiving holes are closed from outside of the motor with a sheet member and an adhesive is filled therein for fixedly securing the coil wound around each of the teeth. The adhesive further acts as a damper to absorb magnetic vibration generated at the stator.

Furthermore, according to another aspect of the brushless motor according to the present invention, a rotor body which constitutes a turntable is used as a bearing holder for the rotor. The hub of the motor which carries a rotor magnet secured on its inner circumferential surface, is mounted on the outer circumferential surface of the table body such that the rotor does not align with the turntable in the axial direction, thereby further reducing the axial height of the motor.

According to still another aspect of the brushless motor of the present invention, one of a pair of bearings interposed between the base plate and the rotor is disposed outside of the other bearing with respect to the radial direction, a plurality of receiving holes are formed on the base plate to correspond to the teeth of the stator core, the rotor functions as a turntable on which a data storage device is detachably mounted and the rotor magnet functions as a chucking magnet to magnetically attract the data storage device. Therefore, the motor is small in axial height, carries sufficient amount of winding of coil, and has a simple structure.

The above and other objects, features and advantages of the present invention will become clear from the following description of the preferred embodiments when the same is read in conjunction with the accompanying drawings.

DESCRIPTION OF THE PREFERRED EMBODIMENTS

Explanation will be made about a first embodiment of the present invention with reference to FIGS. 1 through 4.

Figure 1:
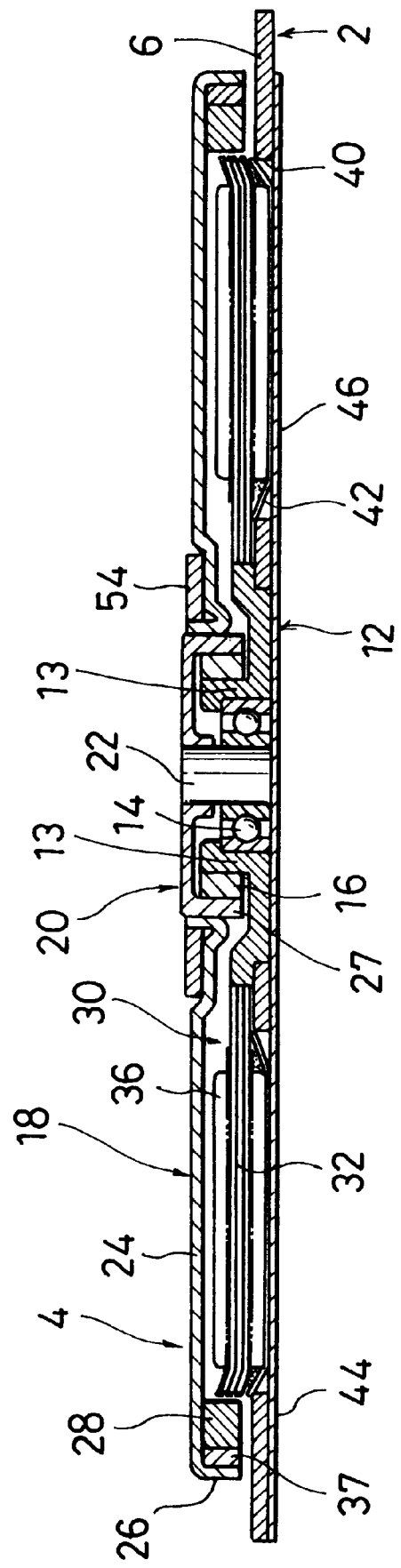
FIG. 1 is a cross-sectional view of a first embodiment of the brushless motor according to the present invention.
Figure 2:
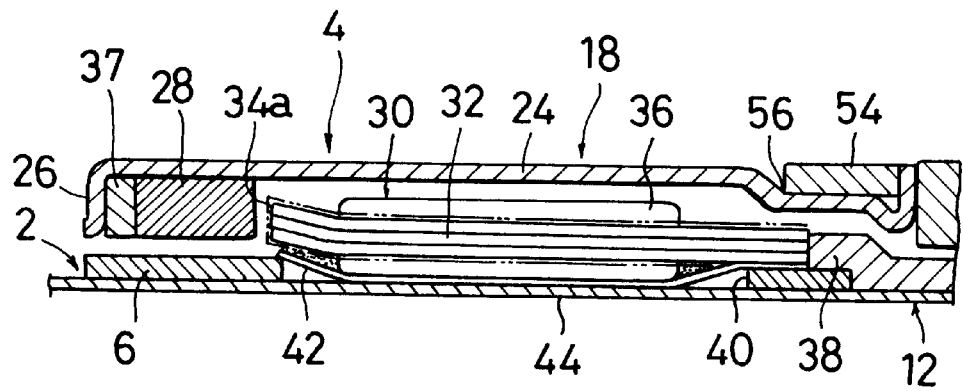
FIG. 2 is a partially enlarged sectional view illustrating part of the brushless motor shown in FIG. 1.
Figure 3:
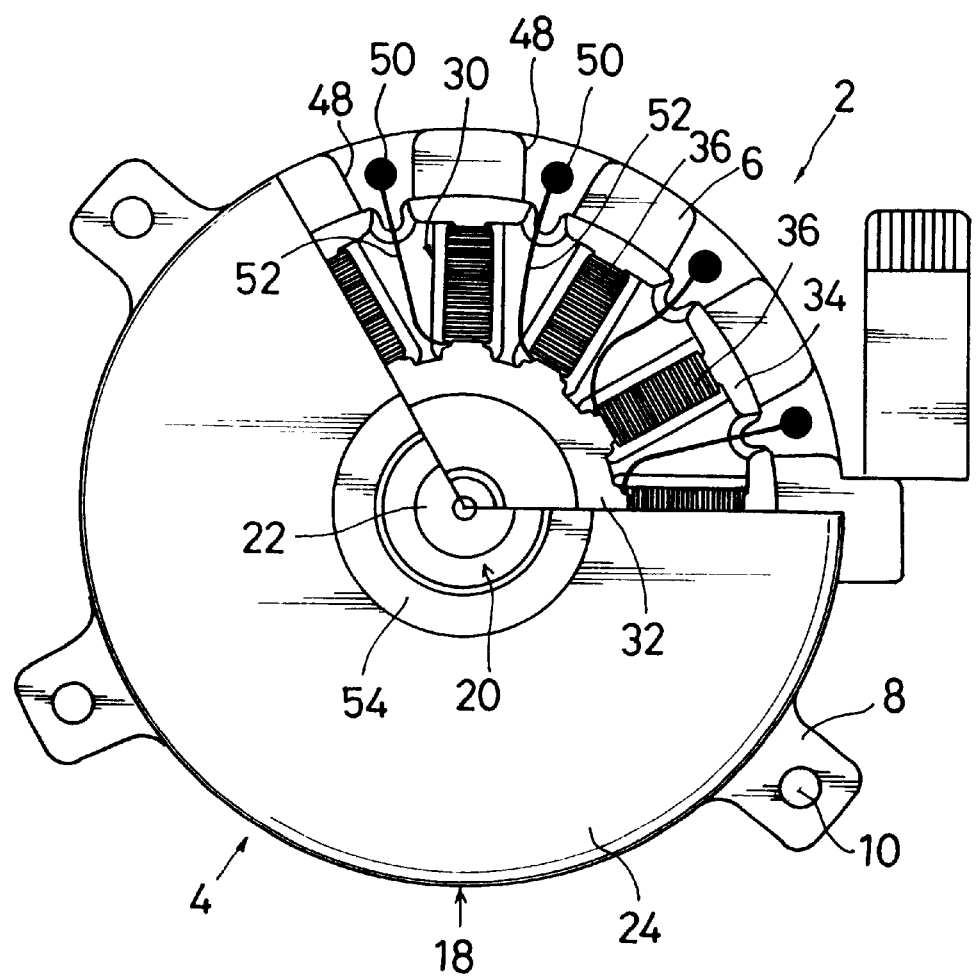
FIG. 3 is a partially cutaway top plan view of the brushless motor shown in FIG. 1.
Figure 4:
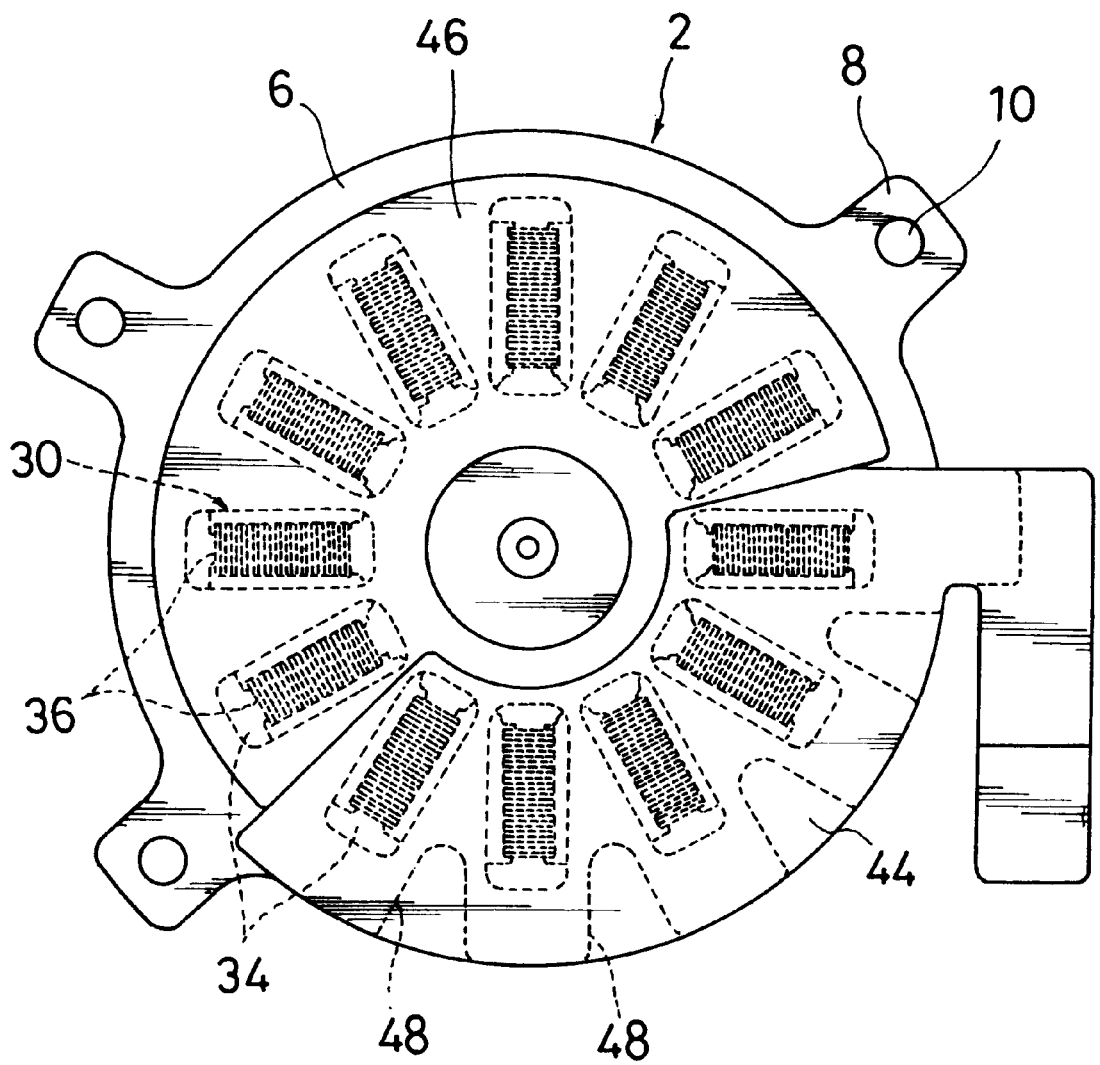
FIG. 4 is a bottom view of the brushless motor shown in FIG. 1.

The brushless motor shown in FIGS. 1 and 2 includes a base plate 2 and a rotor 4 which is rotatable relative to the base plate 2. The base plate 2 has a circular plate member 6 made of a metallic plate. The plate member 6 is provided with three fixing portions 8 circumferentially spaced apart from each other as shown in FIGS. 3 and 4. A hole 10 is formed on each fixing portion 8 and the base plate 2 is fixed on the base member of a drive unit (not shown) by fixing screws (not shown) which are screwed to the base member of the drive unit through each hole 10.

A bearing holder 12 is attached to the central portion of the plate member 6. A pair of bearings 14 and 16 are interposed between the bearing holder 12 and the rotor 4. The bearing holder 12 has a cylindrical supporting wall 13 extending upward and one of the bearings 14 is mounted on the inner periphery of the supporting wall 13. The other bearing 16 is mounted on the outer circumference of the supporting wall 13. As shown in FIG. 1, the pair of bearings 14 and 16 are disposed such that the bearing 16 is positioned on radially outside of the bearing 14. As the result of the pair of bearings being disposed in radial direction as mentioned above, the motor may be small in the axial height. Furthermore, in the first embodiment, one of the bearings 14 disposed radially inside of the other bearings 16 is a ball bearing and the other bearing 16 disposed radially outside is, for example, a sleeve bearing made of oil impregnated metallic material or wear-resistant resin. As the result of the ball bearing 14 being disposed radially inside and the sleeve bearing 16 being disposed radially outside to be in parallel with each other as mentioned above, the shaft 22 is not likely to incline and the rotor 4 is stably supported by the pair of bearings 14 and 16. Furthermore, the sleeve bearing has a greater bearing rotational loss than the ball bearing and is therefore somewhat inferior in rotational performance. However, because the sleeve bearing is provided along with the ball bearing, the motor is not subject to deterioration in rotational performance and is manufactured at loss production costs. Further, the sleeve bearing may be easily changed in its configuration, and the motor may be small in the axial height without influencing on the interior structure of the motor.

The rotor 4 shown in FIGS. 1 and 2 has a cup-shaped hub 18. A circular turntable 20 is mounted on the inner periphery of the hub 18 and the shaft 22 is fixed to the turntable 20. The hub 18 is formed, for example, by a pressworked plate-shaped member. The hub 18 has a circular top wall 24 and a circumferential wall 26 extending toward the base plate 2 from the outer periphery of the top wall 24. The inner periphery of the top wall 24 is fixed to the outer circumference of the turntable 20 by, for example, press fitting. Furthermore, an annular rotor magnet 28 is secured on the inner periphery of the circumferential wall 26 of the hub 18. The rotor magnet 28 acts as a magnet for generating motor drive force in cooperation with a stator 30 which will be described later.

As shown in FIG. 1, one end of the shaft 22 is fixed to the turntable 20 and is rotatably supported by the supporting wall 13 of the bearing holder 12 through one of the bearings 14. Furthermore, on the outer periphery of the turntable 20 is provided with an annular depending portion 27 depending toward the bearing holder 12 and the depending portion 27 is rotatably supported by the supporting wall 13 of the bearing holder 12 through the other bearings 16. Therefore, the rotor 4 is stably rotatably supported by the supporting wall 13 of the bearing holder 12 through the pair of bearings 14 and 16. In this embodiment, the bearing 16 for which a sleeve bearing is used, is attached on the inner periphery of the depending portion 27 of the turntable 20 and the inner periphery of the bearing 16 serves as a sliding surface for the bearing holder 12. As shown in FIG. 1, the depending portion 27 of the turntable 20 is shaped to cover a pair of bearings 14 and 16 to prevent leakage of lubricating oil from the bearings 14 and 16 to the outside of the motor.

A stator 30 is disposed to oppose the rotor magnet 28. The stator 30 has a stator core 32 formed by a plurality of core plates (3 plates in this embodiment) stacking one over another. The stator core 32 has a plurality of teeth 34 (12 pcs. in this embodiment shown in FIG. 4) which are circumferentially disposed and equally spaced apart from each other. An insulating membrane which is indicated by chain double-dashed line or a phantom line in FIG. 2 is formed on the outer surface of the stator core 32. The teeth 34 extend radially outward toward the rotor magnet 28 and a coil 36 is wound around each of the teeth 34 as specified. In this embodiment, the bearing holder 12 is provided with an annular projection 38 projecting radially outward and the inner periphery of the stator core 32 is fixed on the outer circumference of the annular projection 38 by means of caulking, press fitting or adhesion.

In this embodiment, in order to reduce the clearance between the inner periphery of the rotor magnet 28 and the outer circumference of the teeth 34 of the stator core 32, a spacer 37 made of non-magnetic material is provided between the inner periphery of the circumferential wall 26 of the hub 18 and the outer circumference of the rotor magnet 28. The spacer 37 may be made of magnetic material and used as a back yoke for the rotor magnet 28. Furthermore, in order to enhance the magnetic efficiency between the stator 30 and the rotor magnet 28, the outer tips of the teeth 34 of the stator core 32 are slightly bent upward. Therefore, even when the stator 30 is positioned slightly below the rotor magnet 28, the outer circumference 34a of the teeth 34 of the stator core 32 appropriately oppose to the inner periphery of the rotor magnet 28, so that the magnetic efficiency between the stator 30 and the rotor magnet 28 is improved.

As shown in FIGS. 2, 3 and 4, a plurality of rectangular receiving holes 40 is formed on the plate member 6 of the base plate 2 so as to correspond to each of the teeth 34 of the stator 30. The size of the receiving hole 40 is slightly larger than the outside diameter of the coil 36 wound around each of the teeth 34. As shown in FIG. 2, at least a part of the coil 36 wound around each of the teeth 34 is accommodated within the receiving hole 40. As the result of accommodating at least a part of the coil 36 within the receiving hole 40, a sufficient amount of winding of coil can be secured even if the axial clearance between the base plate 2 and the rotor 4 is small and the motor may be small in the axial height. Further, in this embodiment, receiving holes 40 are provided corresponding to the number of teeth 34. However, a single receiving hole 40 may be used to accommodate a plurality of teeth 34. The configuration of the receiving hole 40 can also be suitably changed as required in accordance with the configuration, dimensions and quantity of teeth 34.

An insulating sheet 42 is disposed between the base plate 2 and the stator 30. The insulating sheet 42 which is made of, for example, synthetic resin material has a dimension that corresponds to the radial size of the stator 30. A plurality of openings is formed on the insulating sheet 42 corresponding to the receiving hole 40 formed on the base plate 2. At least a part of the coil 36 is accommodated within the receiving holes 40 through the opening of the insulating sheet 42. Insulation characteristics between the stator 30 and the base plate 2 are sufficiently secured by the insulating sheet 42.

As shown in FIG. 4, in this embodiment, a substantially hemispherical flexible printed circuit board 44 and a nameplate 46 stating a manufacturer's name, etc. are attached on the outer surface of the base plate 2. The flexible printed circuit board 44 and the nameplate 46 serve as a sheet-shaped member which seals the receiving holes 40 of the base plate 2. As the flexible printed circuit board 44 and the nameplate 46 are attached to the outer surface of the base plate 2, the receiving holes 40 can be sealed from outside of the motor. Adhesive is filled in the receiving holes 40 from inside of the base plate 2 in the condition that the receiving holes 40 are sealed. The stator 30 is firmly secured to the base plate 2 by the adhesive filled in the receiving holes 40. Furthermore, the adhesive acts as a damper such that magnetic vibrations generated at the stator 30 may be absorbed.

If all the receiving holes 40 can be sealed, for example, by the flexible printed circuit board 44, the nameplate 46 can be omitted. In addition, if no flexible printed circuit board is used for connecting a lead from the coil 36, all the receiving holes 40 can also be sealed with the nameplate 46.

As shown in FIGS. 3 and 4, on the outer periphery of the plate member 6 of the base plate 2, four recesses 48 are circumferentially formed and spaced apart from one another. Each recess 48 is disposed between adjacent teeth 34 and extends radially inward from the outer periphery of the plate member 6 to the tips of teeth 34. A plurality of lands 50 are provided on the flexible printed circuit board 44 at the portion corresponding to each recess 48. Since the lead 52 of the coil 36 is electrically connected to the specified land 50 through the corresponding recess 48, the lead 52 is relatively and easily connected to the land 50. Furthermore, because the lands 50 are provided in the recesses 48 of the plate member 6, the lands 50 are prevented from being in contact with the teeth 34.

Therefore, the construction and arrangement the base plate 2, the rotor 4, the bearings 14 and 16, the stator 30 and the flexible printed circuit board 44 attains the reduction of the axial height of the motor.

In this embodiment, the inner periphery of the top wall 24 of the hub 18 is bent axially inward to correspond to the configuration of the stator 30 and an annular recess 56 is formed at the bent portion of the hub 18. A chucking magnet 54 is accommodated and secured in the annular recess 56 for magnetically attracting a data storage device (not shown) such as a floppy disk. The top surface of the turntable 20 and the chucking magnet 54 are set to be flush with each other for reducing axial height of the motor at a low level.

Figure 5:
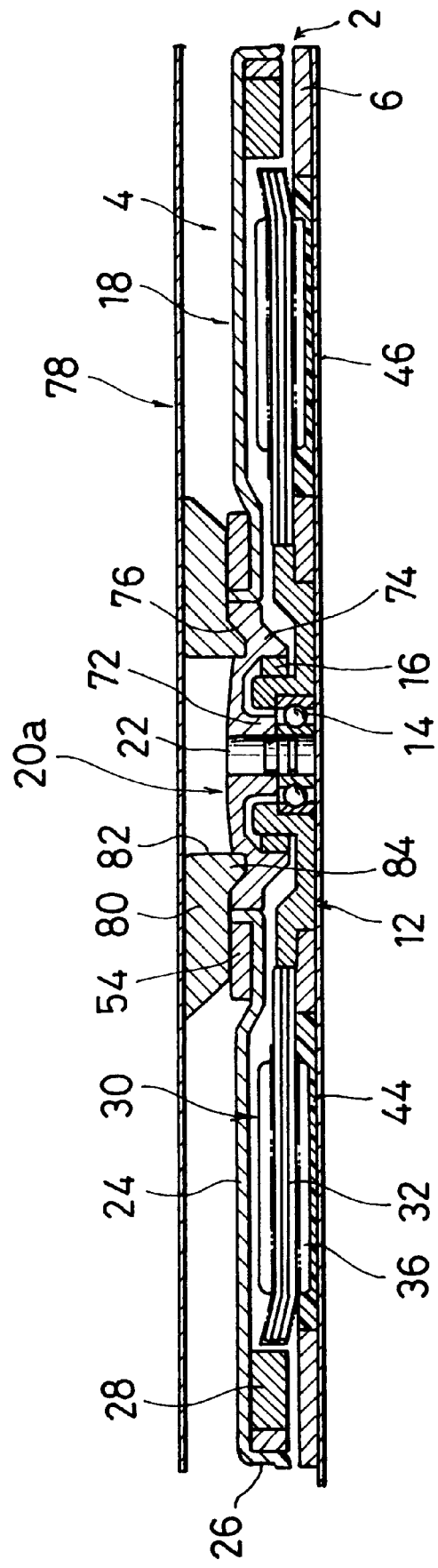
FIG. 5 is a cross-sectional view of a second embodiment of the brushless motor according to the present invention.

FIG. 5 shows a second embodiment of the brushless motor of the present invention. Further, in the subsequent embodiments the same reference numerals will be affixed to substantially the same members as those shown in FIGS. 1 to 4, and explanation thereof are omitted.

With reference to FIG. 5, a turntable 20a has an inner depending portion 72 formed on the inner periphery and an outer depending portion 74 formed on the outer periphery. One end of a shaft 22 is fixed to the inner depending portion 72 and other end of the shaft 22 is rotatably supported by the bearing holder 12 through one bearing 14. The outer depending portion 74 is also rotatably supported by the bearing holder 12 through the other bearing 16. Furthermore, a cup-shaped hub 18 is attached on the outer circumference of the turntable 20a and an annular chucking magnet 54 is secured on the inner periphery of the top wall 24 of the hub 18. In this embodiment, the bearing 16 is attached on the inner periphery of the outer depending portion 74 of the turntable 20a and the inner periphery of the bearing 16 serves as the sliding surface for the bearing holder 12.

In the second embodiment, an annular recess 76 is formed on the top surface of the turntable 20a and the outer circumferential wall defining the annular recess 76 inclines radially inwardly downward. On the other hand, a disk-shaped magnetic plate 80 is provided at the central portion of a data storage device 78 and a circular through hole 82 is formed at the central portion of the magnetic plate 80. A projection 84 projects downwardly and is formed on the inner periphery of the magnetic plate 80 that defines the through hole 82. The outer circumference of the projection 84 inclines radially inwardly downwards to correspond to the inclined configuration of the outer side surface of the annular recess 76. The data storage device 78 is therefore centered at the specified position by positioning the projection 84 of the magnetic plate 80 in the annular recess 76 of the turntable 20a and the magnetic plate 80 is detachably attached on the turntable 20a and the chucking magnet 54 by being magnetically attracted to the chucking magnet 54.

In the second embodiment, the annular recess 76 is formed on the turntable 20a and the magnetic plate 80 of the data storage device 78 is provided with the projection 84. As a result, similar to the motor of the first embodiment shown in FIG. 1, the overall motor height can be small and the data storage device 78 can be reliably centered.

Figure 6:
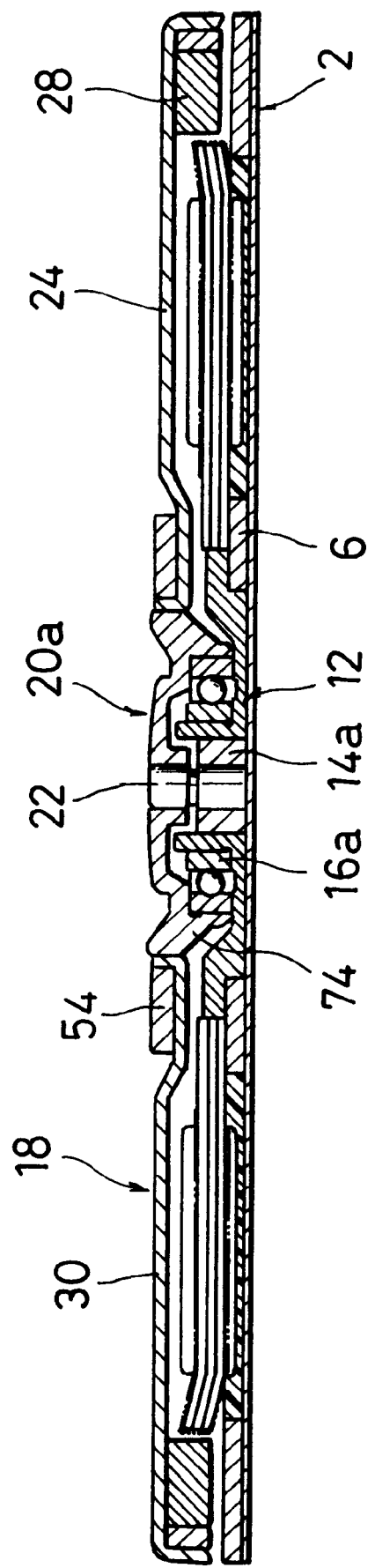
FIG. 6 is a cross-sectional view of a third embodiment of the brushless motor according to the present invention.

FIG. 6 illustrates a third embodiment of the brushless motor according to the present invention.

As shown in FIG. 6, a bearing holder 12 is attached to the central portion of a base plate 2 and a bearing 14a is interposed between the bearing holder 12 and a shaft 22 which, in turn is fixed to a rotor 4. A sleeve made of oil impregnated metallic material or wear-resistant resin is used as the bearing 14a with the inner periphery of the sleeve serves as a sliding surface for the shaft 22. Furthermore, the other bearing 16a is interposed between an outer depending portion 74 of a turntable 20a and the bearing holder 12. A ball bearing is used for the bearing 16a.

As mentioned above, because the ball bearing is disposed at the radially outside and the sleeve bearing is disposed radially inside, the bearing with smaller bearing rotational loss is disposed radially outside portion where a load is greater. Similar to the brushless motor shown in FIG. 1, the overall motor height can be small while simultaneously improving the rotational characteristics.

Figure 7:
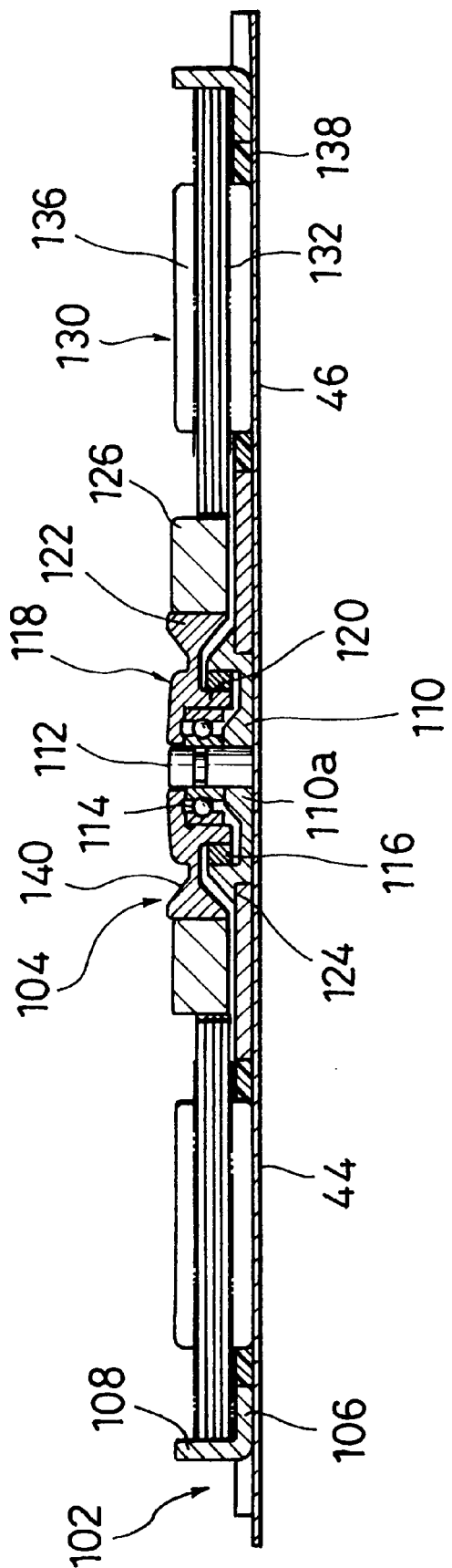
FIG. 7 is a cross-sectional view of a forth embodiment of the brushless motor according to the present invention.

FIG. 7 shows a forth embodiment of the brushless motor according to the present invention.

The brushless motor shown in FIG. 7 includes a base plate 102 and a rotor 104 which is rotatable relative to the base plate 102. The base plate 102 has a circular plate member 106. An outer circumferential wall 108 is integrally formed with the outer periphery of the plate member 106 to extend upwardly.

A bearing holder 110 is attached to the central portion of the plate member 106 and a shaft 112 is fixed on a boss 110a which is integrally formed on the bearing holder 110. The rotor 104 is rotatably supported by the shaft 112 and the bearing holder 110 through a pair of bearings 114 and 116. The rotor 104 includes a turntable 118. The turntable 118 has a depending portion 120 which extends downwardly and an extending portion 122 which extends radially outward. In this embodiment, the inner periphery of the depending portion 120 of the turntable 118 is rotatably supported by the shaft 112 through one bearing 114 and the outer circumference of the depending portion 120 is rotatably supported by an annular supporting portion 124 of the bearing holder through the other bearing 116. Further, in this embodiment, the bearing 116 is attached to the turntable 118 and the outer circumference of the bearing 116 serves as a sliding surface for the bearing holder 112.

Also in this embodiment, similar to the first embodiment of the present invention explained above, the pair of bearings 114 and 116 are disposed such that the bearing 116 is positioned radially outside of the bearing 114. The bearing 114 disposed radially inside employs a ball bearing and the bearing 116 disposed radially outside employs a sleeve bearing. Because the bearings 114 and 116 are arranged as mentioned above, the motor may have a small axial height and the rotor 104 may be rotatably supported in a stable condition. Furthermore, similar to the third embodiment of the present invention, the sleeve bearing can be used for the bearing 114 disposed radially inside and the ball bearing can be used for the bearing 116 disposed radially outside.

An annular rotor magnet 126 is secured on the extending portion 122 of the turntable 118. A stator 130 is disposed radially outside of the rotor magnet 126 to oppose the rotor magnet 126. The rotor magnet 126 and the stator 130 cooperate with each other for generating a driving force. The stator 130 has a stator core 132 and the outer periphery of the stator core 132 is attached to the outer circumferential wall 108 of the base plate 102. The stator core 132 is provided with a plurality of teeth circumferentially disposed and spaced apart from one another.

The inner periphery of each of teeth extends radially inward toward the outer circumference of the rotor magnet 126 and a coil 136 is wound around each of teeth as specified.

Substantially the same structures as those of the first embodiment are employed for structure that a part of the coil 136 is accommodated within a receiving hole 138 formed on the base plate 102, the structure that a flexible printed circuit board 44 and a nameplate 46 are attached on the outer surface of the base plate 102 and the structure that an adhesive is filled in the receiving hole 138.

The brushless motor shown in FIG. 7 is a so-called inner rotor type brushless motor in which a stator 130 is disposed radially outside of the rotor magnet 126. In the brushless motor shown in FIG. 7, the rotor magnet 126 serves as a driving magnet and also as a chucking magnet for magnetically attracting a data storage device (not shown). An annular recess 140 is formed on the top surface of a turntable 118. A projection (not shown) formed on a magnetic plate of the data storage device is centered and positioned within the annular recess 140. Furthermore, the outer circumference of the rotor magnet 126 faces the inner periphery of the stator core 132 of the stator 130.

In the brushless motor shown in FIG. 7, because the rotor magnet 126 also serves as a chucking magnet, a magnet for magnetically attracting a data storage device may be deleted. As a result, similar to the motor shown in FIG. 1, the overall motor height can be small while simplifying the motor configuration at the same time.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A brushless motor comprising:
    a base plate having a cylindrical member;
    a shaft inserted into the cylindrical member;
    a rotor fixed to the shaft and being rotatable relative to the base plate, the rotor including a cup-shaped member having a circumferential wall surrounding the outer periphery of the cylindrical member and a rotor hub attached to the outer peripheral surface of the cup-shaped member;
    a pair of bearings interposed between the base plate and the rotor, one of the bearing being disposed between the inner peripheral surface of the cup-shaped member and the outer peripheral surface of the cylindrical member and the other one of the bearing being disposed between the inner peripheral surface of the cylindrical member and the outer peripheral surface of the shaft, the latter bearing being located inside of the former bearing so that both bearing axially overlap with each other;
    an annular rotor magnet secured to the inner surface of the rotor hub;
    a stator including a stator core having a plurality of teeth and coils respectively wound around each of the teeth, the stator disposed on the base plate so as to oppose the inner peripheral surface of the rotor magnet, the base plate being provided with a plurality of through holes to correspond to the teeth, and a part of the coils being accommodated within the through holes; and
    a sheet member fitted on the outer surface of the base plate to close the lower openings of the through holes, and wherein the base plate is provided with a plurality of recesses which extend in a radially inward direction at the position between the adjacent teeth, and coil leads led from the coils are electrically connected with a flexible printed circuit board within the recesses.

2. A brushless motor of claim 1, wherein the one of the bearings is a ball bearing and the other is a sleeve bearing.

3. A brushless motor of claim 2, wherein the sleeve bearing is disposed radially inward of the ball bearing.

4. A brushless motor of claim 2, wherein the sleeve bearing is disposed radially outward of the ball bearing.

5. A brushless motor of claim 1, wherein an insulating sheet is fitted on the inner surface of the base plate, the insulating sheet has a plurality of openings corresponding to the position and the configuration of the through holes and the coil is accommodated within the through holes through the openings of the insulating sheet.

6. A brushless motor of claim 1, wherein an adhesive is filled in the through holes to fixedly secure the coil accommodated within the through holes.

7. A brushless motor comprising:
    a base plate having a cylindrical member;
    a shaft fixed to the base plate;
    a rotor rotatable relative to the shaft, the rotor including a circular member and an annular depending member depending from the lower surface of the circular member and located radially inward of the cylindrical member;
    a pair of bearings interposed between the base plate and the rotor, one of the bearing being disposed between the inner peripheral surface of the cylindrical member and the outer peripheral surface of the annular depending member and the other one of the bearing being disposed between the inner peripheral surface of the annular depending member and the outer peripheral surface of the shaft, the latter bearing being located inside of the former bearing so that both bearing axially overlap with each other;
    an annular rotor magnet secured to the outer circumferential surface of the circular member;
    a stator including a stator core having a plurality of teeth and a coil wound around each of the teeth, the stator disposed on the base plate so as to oppose the outer peripheral surface of the rotor magnet, the base plate being provided with a plurality of through holes to correspond to the teeth, and a part of the coil being accommodated within the through holes; and
    a sheet member fitted on the outer surface of the base plate so as to close the lower openings of the through holes.

8. A brushless motor of claim 7, wherein the one of the bearings is a ball bearing and the other is a sleeve bearing.

9. A brushless motor of claim 8, wherein the sleeve bearing is disposed radially inward of the ball bearing.

10. A brushless motor of claim 8, wherein a sleeve bearing is disposed radially outward of the ball bearing.

11. A brushless motor of claim 7, wherein an insulating sheet is fitted on the inner surface of the base plate, the insulating sheet has a plurality of openings corresponding to the position and the configuration of the through holes and the coils is accommodated within the through holes through the openings of the insulating sheet.

12. A brushless motor of claim 7, wherein an adhesive is filled in the through holes to fixedly secure the coil accommodated within the through holes.

13. A brushless motor of claim 7, wherein the base plate is provided with a plurality of recesses which extend in radially inward direction at the position between the adjacent teeth, a coil lead led from the coil is electrically connected with a flexible printed circuit board within the recesses.

14. A brushless motor comprising:
   a stationary base plate having a cylindrical member extending in the rotational axis of the motor;
   a shaft rotatable relative to the base plate and having a portion received within the cylindrical member;
   a rotor fixed to the shaft to rotate integrally with the shaft, and having a cup-shaped member with a circumferential wall surrounding the cylindrical member;
   a first bearing interposed between the cup-shaped member and the cylindrical member;
   a second bearing interposed between the cylindrical member and the shaft, the first bearing being disposed outside of the second bearing to overlap with the second bearing with respect to the direction of the rotational axis;
   a stator including a stator core having a plurality of teeth and coils respectively wound around the teeth, the base plate being formed with a plurality of through holes at position corresponding to the teeth to receive a part of each coil; and
   a sheet member for covering the through holes of the base plate from the outside of the motor, and wherein the base plate is provided with a plurality of recesses which extend in a radially inward direction at the position between the adjacent teeth, and coil leads led from the coils are electrically connected with a flexible printed circuit board within the recesses.

15. A brushless motor of claim 14, wherein the first bearing is a ball bearing and the second bearing is a sleeve bearing.

16. A brushless motor of claim 14, wherein the first bearing is a sleeve bearing and the second bearing is a ball bearing.

17. A brushless motor of claim 14, wherein an insulating sheet is fitted on the inner surface of the base plate, the insulating sheet has a plurality of openings corresponding to the position and the configuration of the through holes and the coils is accommodated within the through holes through the openings of the insulating sheet.

18. A brushless motor of claim 14, wherein an adhesive is filled in the through holes to fixedly secure the coil accommodated within the through holes.

19. A brushless motor comprising:
   a metallic base plate having a cylindrical member, the base plate for supporting the motor and attaching the motor to an external device;
   a shaft inserted into the cylindrical member;
   a rotor fixed to the shaft and being rotatable relative to the base plate, the rotor including a cup-shaped member having a circumferential wall surrounding the outer periphery of the cylindrical member and a rotor hub attached to the outer peripheral surface of the cup-shaped member;
   a pair of bearings interposed between the base plate and the rotor, one of the bearing being disposed between the inner peripheral surface of the cup-shaped member and the outer peripheral surface of the cylindrical member and the other one of the bearing being disposed between the inner peripheral surface of the cylindrical member and the outer peripheral surface of the shaft, the latter bearing being located inside of the former bearing so that both bearing axially overlap with each other;
   an annular rotor magnet secured to the inner surface of the rotor hub;
   a stator including a stator core having a plurality of teeth and coils respectively wound around each of the teeth, the stator disposed on the base plate so as to oppose the inner peripheral surface of the rotor magnet, the base plate being provided with a plurality of through holes to correspond to the teeth, and a part of the coils being accommodated within the through holes; and
   a sheet member fitted on the outer surface of the base plate to close the lower openings of the through holes.

20. A brushless motor comprising:
   a stationary metallic base plate having a cylindrical member extending in the rotational axis of the motor, the base plate for supporting the motor and attaching the motor to an external device;
   a shaft rotatable relative to the base plate and having a portion received within the cylindrical member;
   a rotor fixed to the shaft to rotate integrally with the shaft, and having a cup-shaped member with a circumferential wall surrounding the cylindrical member;
   a first bearing interposed between the cup-shaped member and the cylindrical member;
   a second bearing interposed between the cylindrical member and the shaft, the first bearing being disposed outside of the second bearing to overlap with the second bearing with respect to the direction of the rotational axis;
   a stator including a stator core having a plurality of teeth and coils respectively wound around the teeth, the base plate being formed with a plurality of through holes at position corresponding to the teeth to receive a part of each coil; and
   a sheet member for covering the through holes of the base plate from the outside of the motor.

* * * * *